United States Patent [19]

Scuitto et al.

[11] 3,875,375

[45] Apr. 1, 1975

[54] READER DEVICE FOR CODED IDENTIFICATION CARD

[75] Inventors: Thomas John Scuitto, Malibu; David Chester Kramer, Redondo Beach, both of Calif.

[73] Assignees: Frederick D. Toye, Woodland Hills, Calif.; Frederick N. Toye, Sherman Oaks, Calif.

[22] Filed: June 18, 1973

[21] Appl. No.: 370,912

[52] U.S. Cl. ...... 235/61.7 B, 235/61.11 E, 250/568

[51] Int. Cl. ........ G06k 7/14

[58] Field of Search ........ 235/61.7 B, 61.11 E; 250/555, 566, 568

[56] References Cited

UNITED STATES PATENTS

| | | | |
|---|---|---|---|
| 3,646,324 | 2/1972 | Macey | 235/61.11 E |
| 3,673,389 | 6/1972 | Kapsambelis et al. | 235/61.7 B |
| 3,691,350 | 9/1972 | Kuhns et al. | 235/61.11 E |
| 3,692,982 | 9/1972 | McMillin | 235/61.11 E |
| 3,702,392 | 11/1972 | St. Jean | 235/61.7 B |
| 3,731,062 | 5/1973 | Reilly, Jr. | 235/61.11 E |
| 3,751,639 | 8/1973 | Searle et al. | 235/61.11 E |

*Primary Examiner*—Stanley M. Urynowicz, Jr.
*Attorney, Agent, or Firm*—Owen, Wickersham & Erickson

[57] ABSTRACT

A dynamic card reader operating on the principle of discriminating transmissivities. This device is for use with a card having a data-acquisition row and at least one data-information row. The reader reads the data-acquisition items and shapes from them pulses which are used in connection with reading the data-information items and to check whether those lie in certain transmissivity ranges, thereby to check the genuine current status of the card. In addition, a keyboard is provided so that an individual can feed into the reader the numbers that he remembers as his identification number; the reader than automatically compares these remembered numbers with the numbers represented in a code he cannot read on the card, thereby determining the authenticity or admissibility of the individual having the card. The machine may then give a release signal which opens a door or gate or in some way can indicate or take action responsive to the presentation of the card by the holder.

22 Claims, 12 Drawing Figures

READER DEVICE FOR CODED IDENTIFICATION CARD

BACKGROUND OF THE INVENTION

This invention relates to a dynamic reader operating on the principles of discrimination between different light transmissivities.

Card systems for determining the authenticity of the card and the authenticity of the individual presenting the card have long been in use; some have used simple printed authorizations, some signed authorizations, some cards bear photographs. Various sorts of so-called tamperproof cards have been provided; recently, cards have been based on punch card systems, raised letters, or concealed codes, such as magnetic codes. All of these have had their advantages and disadvantages.

Heretofore, the permanent magnetic systems have provided the best discrimination, but they have been considerably limted in versatility because of the impossibility of achieving accurate operations when magnetic members of opposite polarity are placed too close to each other and also because of the relatively large area which each magnetic area requires. Also, when such a card is taken apart, it becomes relatively easy to counterfeit. Moreover, when dynamic card readers have been used with magnetic card systems, the readers have been relatively slow.

One object of this invention is to provide a dynamic reader that is actuated almost instantaneously and independently of the rate into which the card is put into the reader, operating at any speed at which the card can possibly be inserted mechanically into the reader.

Another object of the invention is to provide a reader that discriminates very accurately and carefully to determine the genuineness of the card, and to read the data placed thereon, all nearly instantaneously.

Another object of the invention is to provide a system in which the genuineness of the individual possessing the card can be checked by having him place into the reader a code (password or verifying number ) which he knows by memory and which is compared by the reader with the coded information on the card, —information which the individual being checked could not possibly determine by inspection or study of the card.

Another object of the invention is to provide a reader for cards used in a fixed code system, the reader making it relatively easy to accommodate changes of the codes on, for example, a monthly or quarterly basis, to check the authenticity or up-to-dateness of the cards.

Another object of the invention is to provide reading machines which can be used to deny entrance to holders of some particular cards which have become out-of-date or for some other reason have been voided.

SUMMARY OF THE INVENTION

The invention comprises a reader into which a card is inserted, there being suitable aligning means and stop means to assure that the card will be inserted substantially correctly; however, in some instances the reader may purposely place responsibility on the user to present the card in a particular orientation. One row of figures on each card may serve to provide the reader with code acquisition or clock pulses, synchronizing the reading of the information code on the card with the rate at which the card is put into the machine. The code acquisition pulses are shaped by the circuitry inside the reader and then are read to determine whether the complete number of such pulses has been read. Meanwhile, the machine reads the information code on the card and sends it in the form of digital or other coding to a shift register so that several numbers and series can be read there.

In one preferred form of the invention, immediately after insertion of the card and while the card is still inserted, the user feeds to the machine, as by a decimal keyboard, a number or word which he remembers and which is also on the card, but is so coded there that he could not learn it from the card itself. His remembered number or word is sent by the keyboard to a comparator, such as a four-bit comparator, where a shift register, such as sixteen-bit shift register, has already transferred the coded information from the card, four bits at a time. The comparator compares the card-borne information with the information from the keyboard, four bits at a time, and if the remembered and keyboard-presented information fails to match the card-presented information, a red light or other signal is given; a consequential action may be even taken. This action is preferably delayed until the necessary keys, e.g., four keys, have been pressed. If the card and its bearer pass this comparison test, then the genuineness of the user is assured. In the meantime, the reader indicates whether the card itself is a genuine, up-to-date card proper for the machine and whether it has a genuine number on it. If all these things are true, the cardholder gains admittance, or whatever other action he desires to be taken can take place.

In another form of the invention, there is no need for the decimal keyboard verification, but the codes and the cards are changed periodically. The invention then provides a simple system accommodating these changes in codes.

In still other forms of the invention, the reading device is combined with means for voiding particular numbers of cards or for comparing each card with a computer memory unit.

A key feature of the present invention is the use of light transmissivities to supply the card-borne information. A typical card with which this invention is used, is a laminated plastic card which is translucent, but preferably not transparent; although the reader can also be used with cards or other members which are transparent. The reader can also be used with paper tickets or other items bearing the information. However, the use of laminated plastic cards affords the best means of disguising the code, because the code can be located in an inner lamination, and the laminations can be so fused together that the card cannot be taken apart without its complete destruction.

Both the positions and the individual transmissivities of certain portions of the card are key features. Thus, the card itself may be an overall transmissivity which is different from that of a hole through the card. The code system may comprise two different levels of transmissivities which are different not only from full transparency or a hole but are also different from the overall transmissivity of the card, and of course the two transmissivities are different from each other; they may represent, for example, a 9 and a 1 in a binary code.

Since light transmissivity can be detected with great accuracy, there may be more than two levels of transmissivity, but a description of a two-level system, as given below, can illustrate the principles involved. The general principles, of course, are applicable whether there are three or five or ten or a dozen transmissivities or only two.

The system of this invention enables a much greater degree of security than prior art systems, and it also offers great flexibility or versatility in use, since the transmissivity zones can be very small indeed, and many, many data bits can be placed on any one card and as close to each other as desired. Very large numbers of cards can be successfully differentiated readily from each other. This differentiation can be provided not only by changing the code on the card but also by changing the response of the reading machine to the cards, so that it provides a different code interpretation from time to time. Changes in the code themselves may be made as desired, and cards may be replaced as desired to update everything.

Other objects and advantages of the invention will appear from the following description of some preferred embodiments.

A BRIEF DESCRIPTION OF THE DRAWINGS

DESCRIPTION OF SOME PREFERRED EMBODIMENTS

A dynamic card having a variable code

Figures 1, 2:
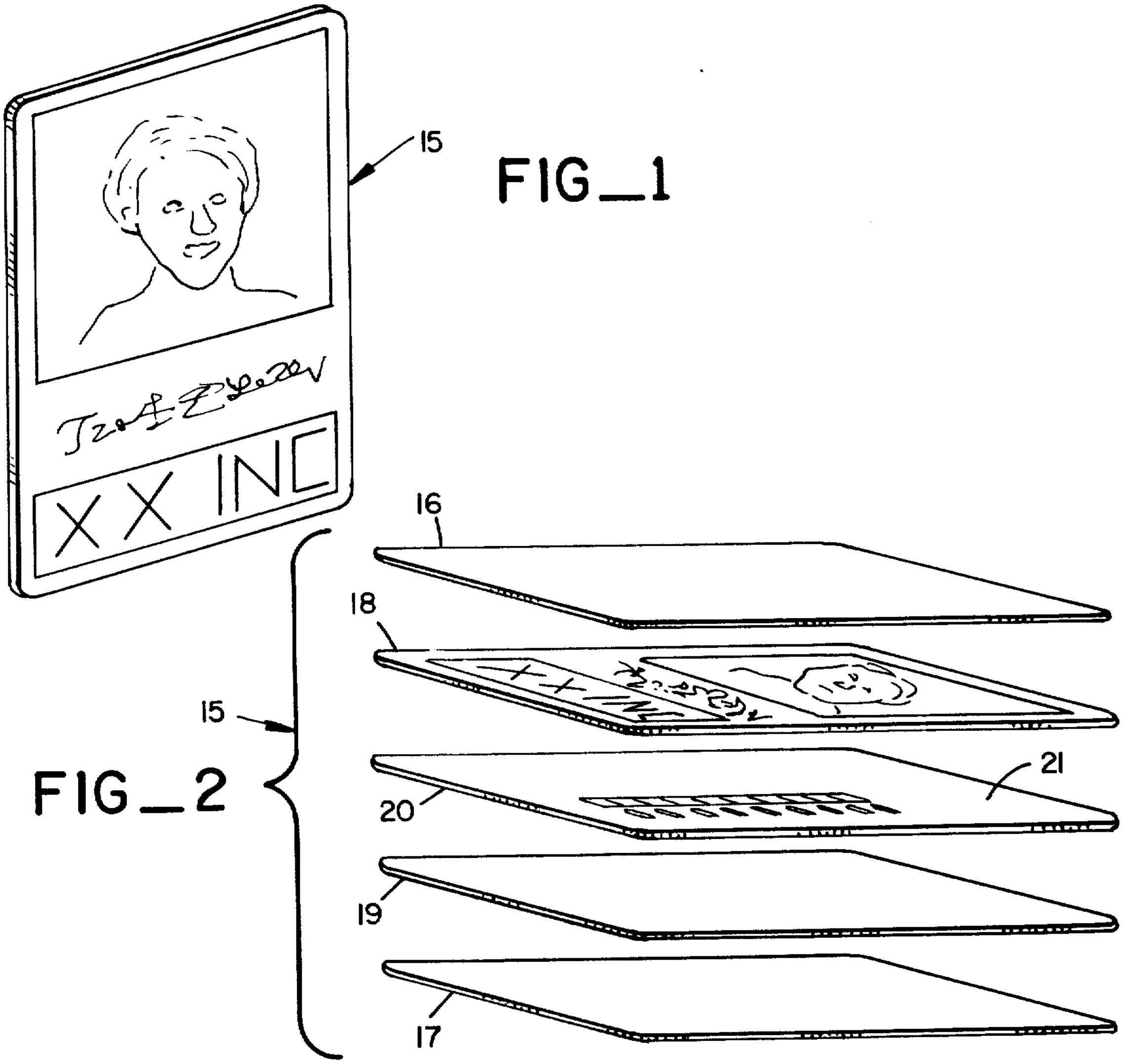
FIG. 1 is a view in perspective of a card for use in a reader embodying the principles of the invention.
FIG. 2 is an exploded view in perspective of the card of FIG. 1.
Figure 3:
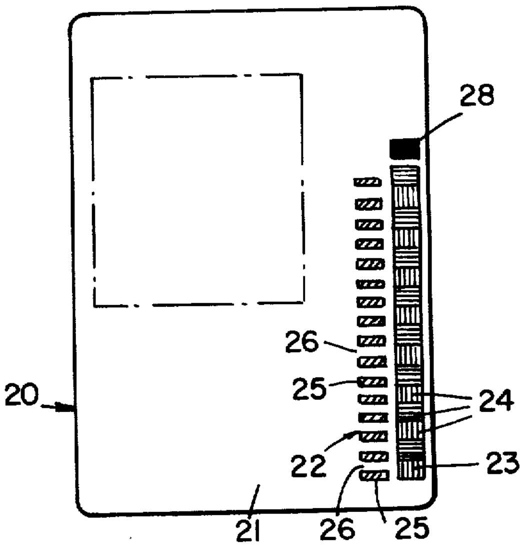
FIG. 3 is a plan view of an inner lamination comprising a code sheet for the card of FIGS. 1 and 2.

FIGS. 1 through 3 illustrate one type of typical identification card 15 used in the invention. The term card as used herein means not only conventional but also tickets, tokens, badges, and other devices, all of which are read in the same general manner.

The card 15 may be a laminated plastic card made of a series of laminations as shown in FIG. 2, all of which are fused together so that there is no longer a delamination capability. Thus, a card 15 may comprise two outermost laminations 16 and 17 of clear plastic, which, in the completed card 15, are fused respectively to an upper lamination 18 and a lower lamination 19, each of carefully controlled white plastic which is translucent but not transparent. One (or more) inner lamination 20 lies between the laminations 18 and 19, at least one of which comprises a code sheet or surface 21 containing the card's code, which is located in a very specific geometrical location, carefully aligned and registered.

The code sheet 21 shown here has two rows 22 and 23. The row 22 may be called the pulse-actuating row or the codeacquisition pulse row, because in the reader it sets up codeacquisition pulses (also known as clocking pulses). The other row 23 may be called the information row; and it contains a series of data zones 24, each one of which is presented to the reading machine in accordance with one pulse that is generated by the code-acquisition pulse row 22.

The code-acquisition pulse row 22 may comprise two different transmissivities 25 and 26 which alternate regularly— a series of dark areas 25 alternating with light areas 26. The areas 25 and 26 may be of exactly the same width and length, or they may be of different size if that is desired; the latter is somewhat less efficient, but may be useful in a particular machine to make it more difficult to counterfeit cards or to solve the code if it should become otherwise known. In any event, the row 22 preferably uses simply a dark-light discrimination which is to set up pulses for synchronizing the reading of the information bits in the row 23, but is not used to provide the information itself. However, there is a set number of the areas 25 and 26. For example, in a four-digit system, where each digit is represented by four bits in a binary coded decimal system, it will be convenient to have 16 pulse zones 26.

Figure 4:
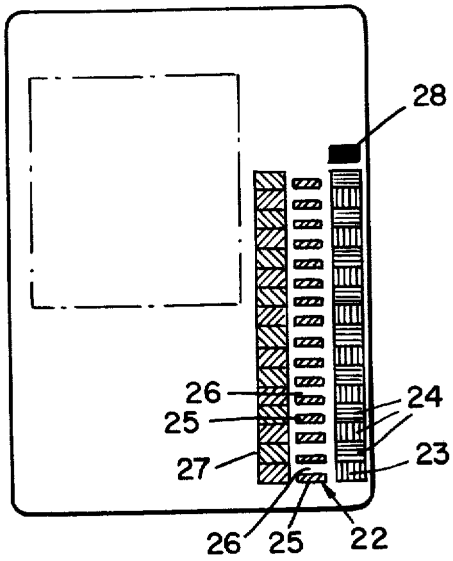
FIG. 4 is a plan view of a modified form of code sheet, also for use in this invention.

The information may be in one row 23 (as shown in FIG. 3) or there may be two or more rows of information (as shown in FIG. 4), for while a single row 23 is shown in FIGS. 1–3 for simplicity, it may often be advisable to have more than one row. For example, one row 23 in the code sheet of FIG. 4 can supply the company or agency identification number, and another row 27 can supply a particular employee's identification number. For a simple example of the reader 30, it will be assumed that either the company requires no identification number but only an employee's identification number or that all it needs is a company identification number. This will not always be true, of course, but it will help to simplify the explanation.

In this present example, each data zone 24 of the information row 23 is chosen from one of two different transmissivities, both of which lie within predetermined limits. Both transmissivities used in the data zones 24 in this instance are preferably, though not necessarily, chosen to be less than complete transparency (e.g., a hole through the card) and also less than the transmissivity of the other areas of the card, so that the card 15 is more translucent elsewhere than it is at the data zones 24. The two data-zone transmissivities are also differentiable from each other and from complete opaqueness and represent different levels of transmissivity. As before stated, there may be several levels of transmissivity instead of only two, but two will illustrate the principle, and how that is applied to BCD (binary coded decimal) systems. The data zones 24 correspond in number to the number of code-actuating pulses 26; hence, for a four-digit BCD system there will be 16 data zones 24.

In addition, there may be a dark area 28 beyond the data zones, used for electronically indicating full insertion of the card 15 in the reader 30, as explained below.

Figures 5, 6, 7:
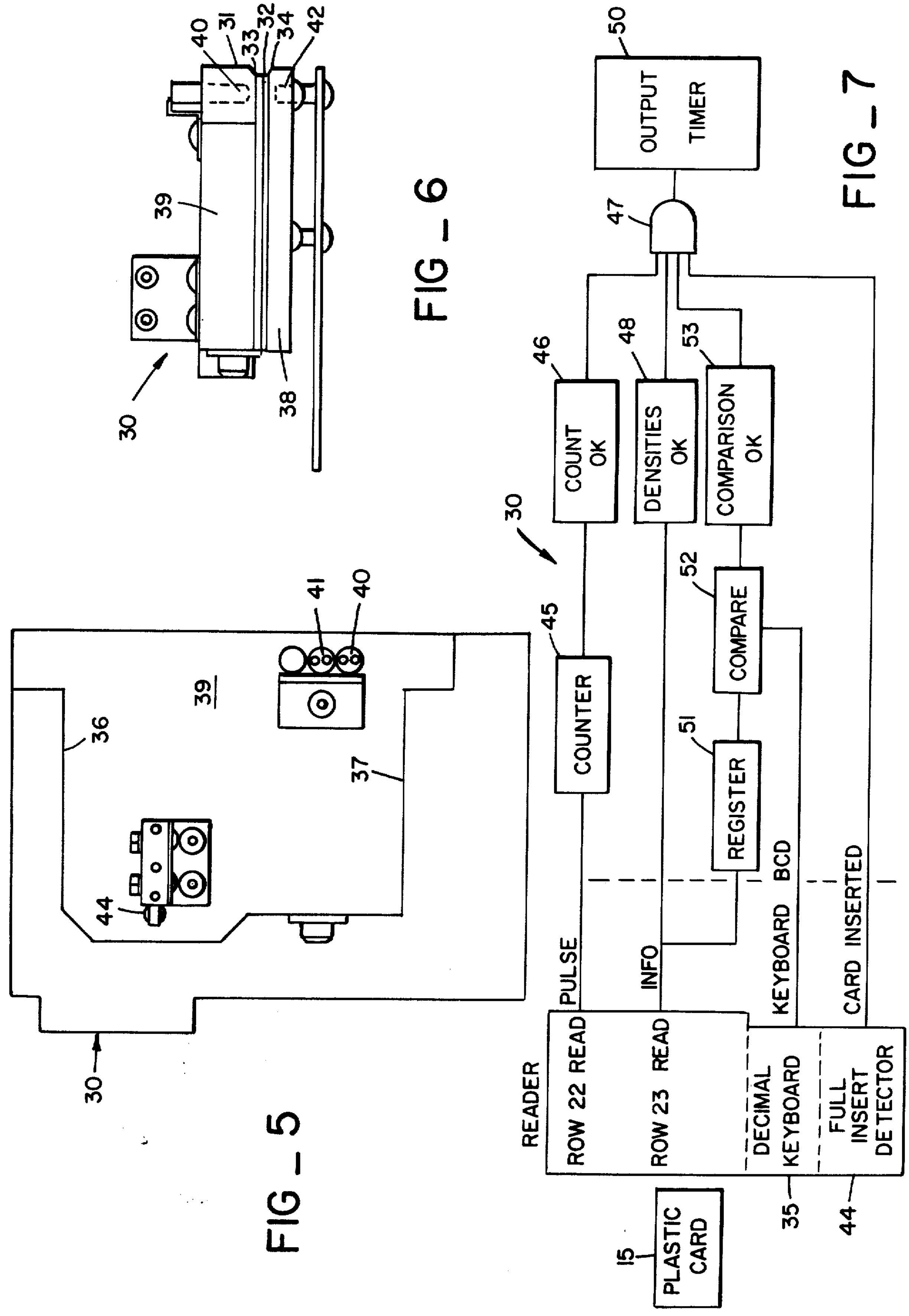
FIG. 5 is a plan view of one-half of a card reading machine embodying the principles of the invention.
FIG. 6 is a view in side elevation partly in section of the machine of FIG. 5.
FIG. 7 is a simple block diagram of the machine of FIGS. 5 and 6.

A variable code reader 30, physical aspects (FIGS. 5-7)

The card reader 30 of FIGS. 5 through 7 is adapted to read the card 15 of FIGS. 1 to 3. The reader 30 has a housing 31 with a card entry slot 32 which may have tapered guides 33 and 34 to help guide the card 15 properly into the slot 32. The reader 30 also has a keyboard 35, shown diagrammatically in FIGS. 7 and 8; the keyboard 35 may have ten keys for the ten decimal digits and a clear key. It may also have a correct key for making corrections, though this is not always needed.

The card slot 32 has suitable side edges 36 and 37 and upper and lower plates 38 and 39 for guides to assure that the card 15 is guided into a precise geometrical position. It also has a pair of lamps 40 and 41 on one plate 38 and a pair of reading phototransistors 42 and 43 on the other plate 39 directly opposite their respective lamps 40 and 41. These lamp-phototransistor pairs are located in precise geometrical positions, with one pair reading the pulse row 22 and another reading the information row 23. A microswitch 44 at the very end of the slot 32 is actuated when and only when the card 15 has been fully inserted. The microswitch 44 may be replaced by an electronic circuit serving the same purpose.

When using a card like that of FIG. 4, there will be three lamps and three phototransitors and corresponding circuits.

The reader 30, electrical circuitry (FIG. 7)

Figure 8A:
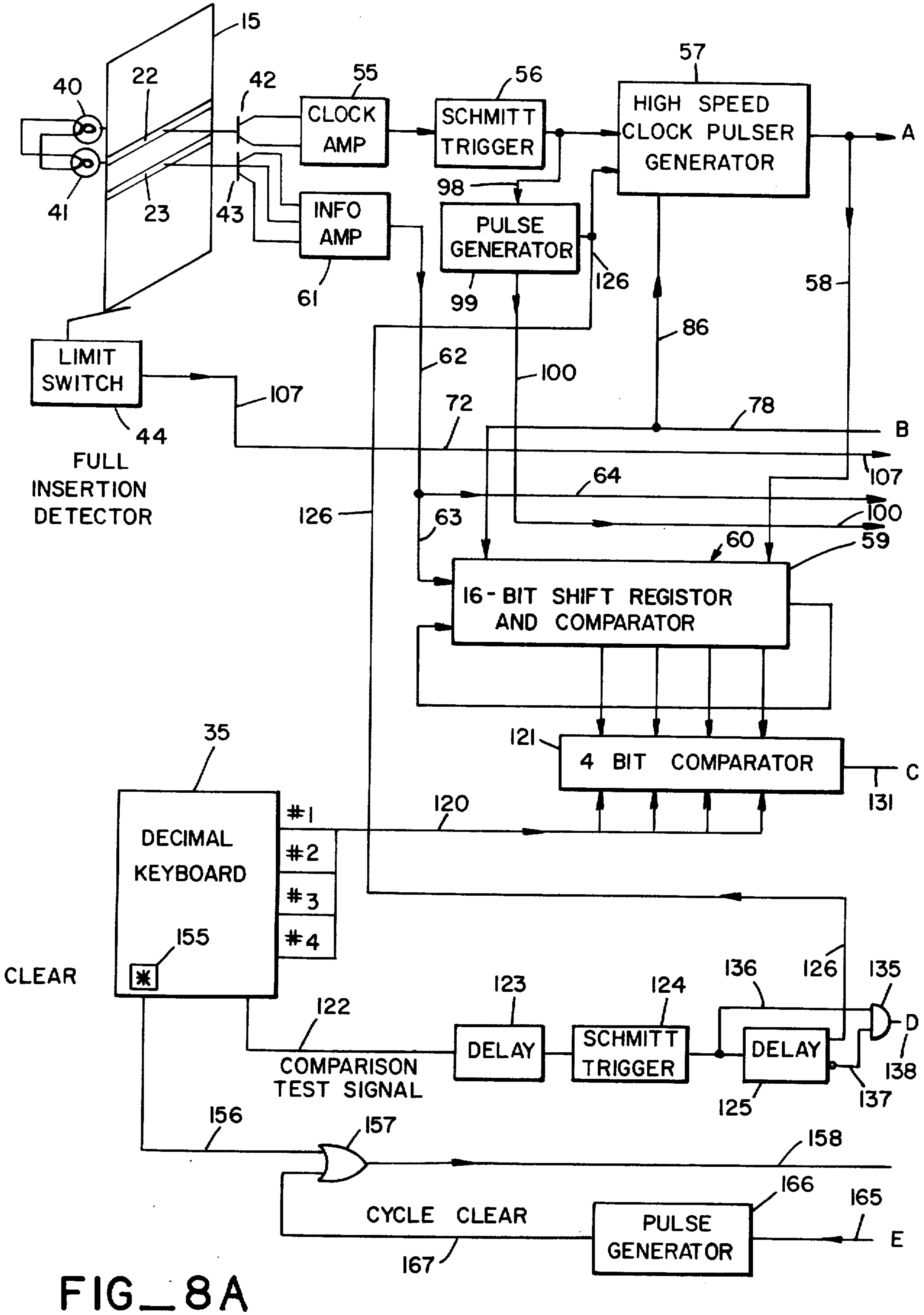
FIG. 8 is a more detailed block diagram of the reader of FIG. 7. This view takes up two sheets, called FIGS. 8A and 8B.
Figure 8B:
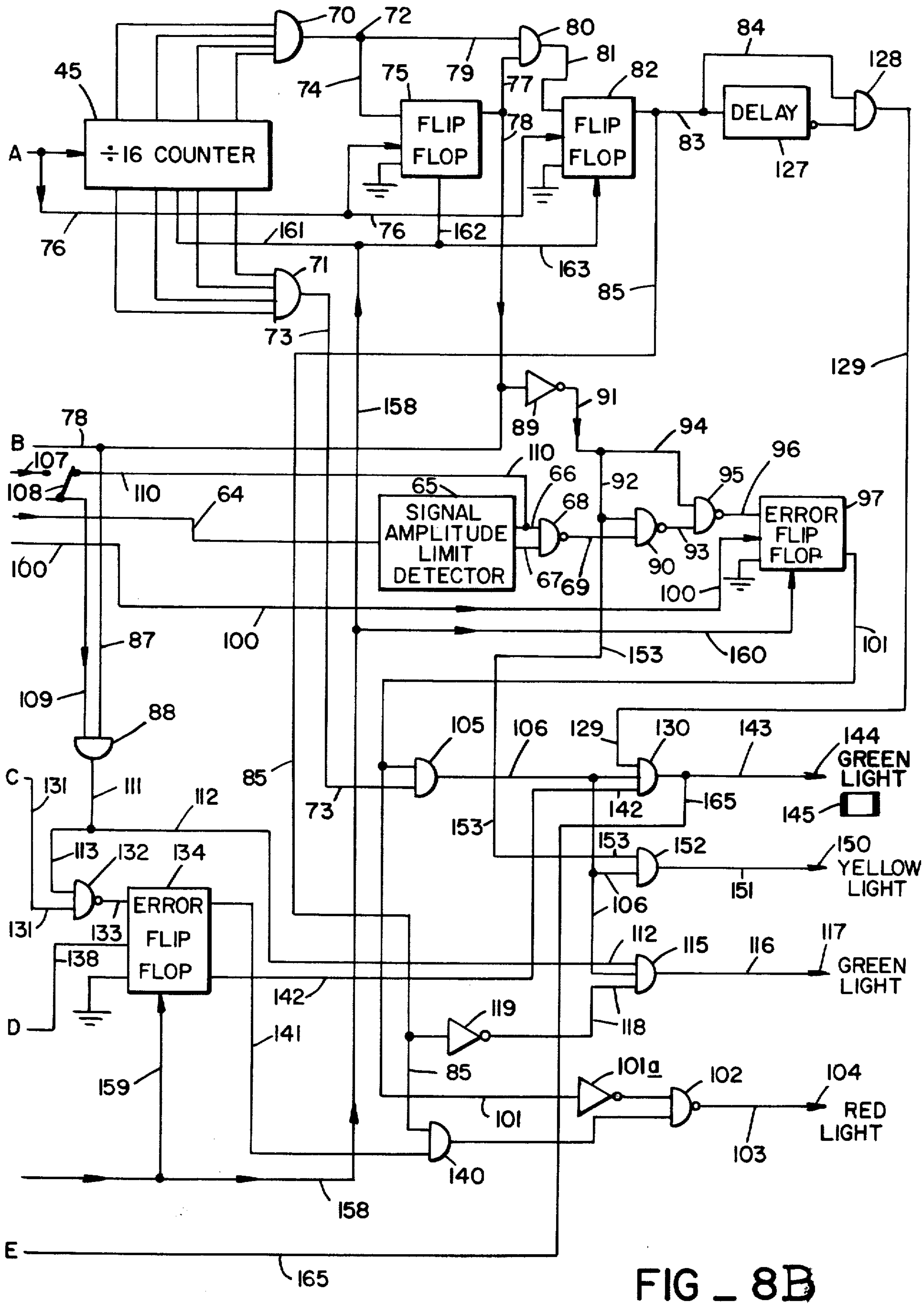

It is very important that the card reader 30 indicate (1) whether the card 15 has been fully inserted (2) whether all of the clock pulses have been read during that full insertion, (3) whether the card 15 presents information identifying it as a genuine, correctly coded card, and (4) when a keyboard 35 is used, whether the keyboard emplaced code corresponds to the code or the card. All this is done by the reader 30 through the circuits shown in block diagrams in FIGS. 7 and 8. Each element of the block diagram of FIG. 8 is well known in the art and lies within the capabilities of electronics engineers. Various degrees of efficiency can, of course, be achieved; but there is no need to explain how each such element works, since it is well known.

The simplified block diagram of FIG. 7 shows the basic functions of the card reader 30. The code-acquisition pulse row 22 is read, and a counter 45 counts them; then the correct number of pulses is obtained, the count is verified at a function 46 and sent to an additive logic system 47. Similarly, the information row 23 is read, and if the densities therein meet the reader's requirements, a density approval function 48 sends its signal to the logic system 47. In a simple form of reader 30 this may be enought to activate an output 50.

In a more complex form of reader, the decimal keyboard 35 is used, and a signal from the information row is sent via a register function 51 to a compare function 52, to be compared with the cardholder's memory as shown by his input to the keyboard 35. If the comparison checks, an approval function 53 sends a signal to the addition logic system 47. Also, there is preferably a full-insert detector such as the microswitch 44 (or other circuitry shown in FIG. 8 and described below) which verifies the full insertion of the card 15 and sends its signal to the additive logic system 47. When all four inputs to the system 47 are received, the output 50 is actuated.

Figure 9:
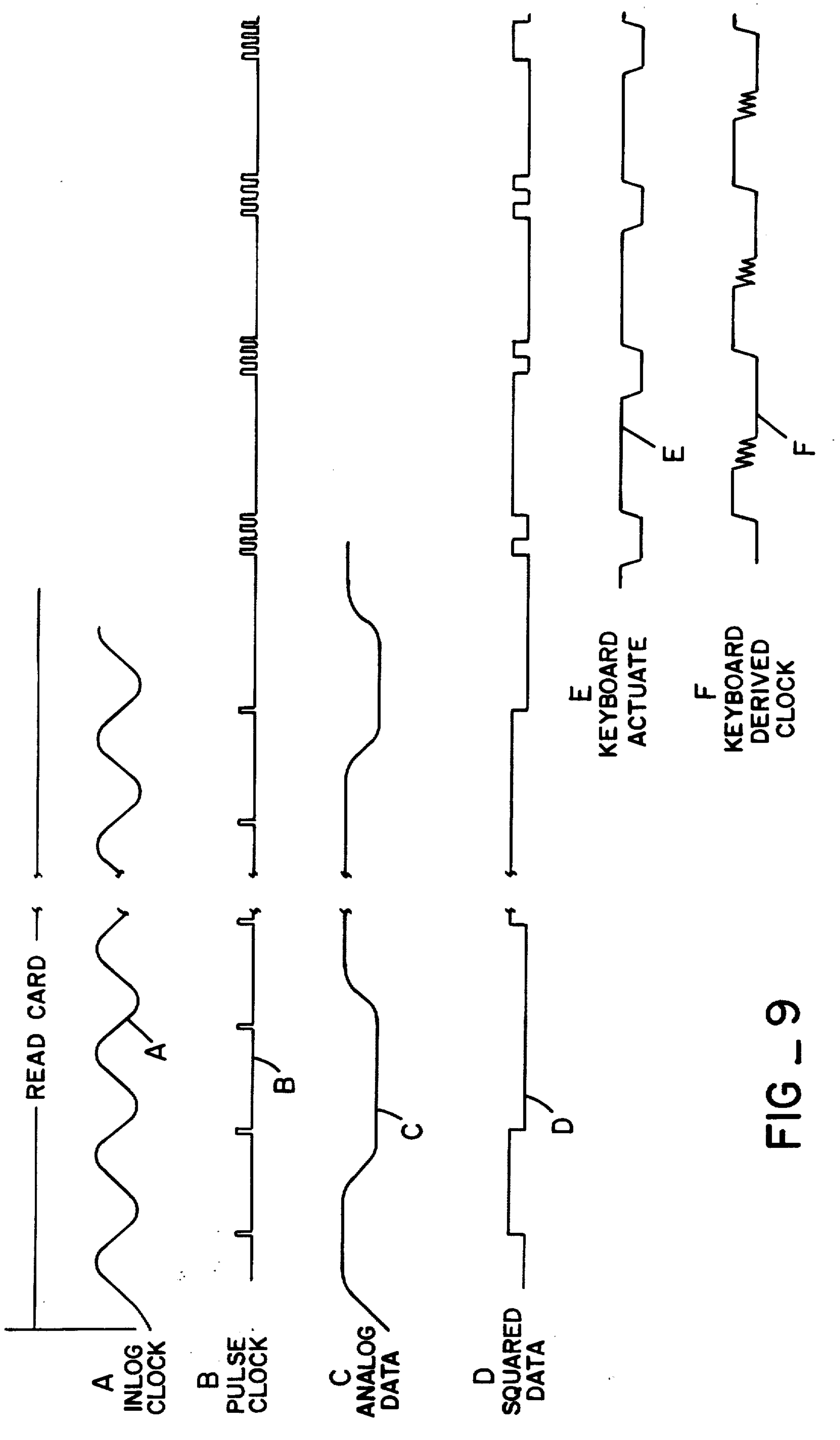
FIG. 9 is a synchronized set of functional curves of the light readings, shaped pulses, etc.

The Reader 30: more detailed circuitry (FIGS. 8 and 9)

FIG. 8 shows an exemplary block diagram circuit embodying the functions of FIG. 7. Here, the operations can be seen in more detail, sufficient for a skilled person to build such a circuit.

Thus, the code-acquisition pulse row 22 is read by light from the lamp 40 passing through it or not passing through it, and the information as given to the phototransistor 42 typically comes out as a substantially sinusoidal curve A in FIG. 9, since the dark portions 25 and light portions 26 alternate at regular intervals, so that there is always some light emitted to the point of total darkness in one direction, and up to a maximum in another. This sinusoidal curve A, amplified by an amplifier 55, is not sharp enough to give the desired sharp pulses; so it is shaped by conventional pulsing means, such as first by a Schmitt trigger 56, and then by a pulse generator 57, to give the desired pulse train B of FIG. 9, with one pulse for each one of the light zones 26 on the row 22, and that pulse is located exactly where it should be located for the best reading of the information row 23. For each pulse, this generator 57 then sends a signal via lead 58 to a gate 59 of a shift register 60, which can then accept one bit of information from an information amplifier 61. A 16 bit shift register 60 is used in this example; other types are of course usable.

The information data zones 24 of the row 23 are simultaneously being read as to their light transmissivity, employing the lamp 41 and the phototransistor 43, which indicates the amount of light passing and sends a corresponding electrical signal by leads 62 and 63 to the information amplifier 61. The amplified information, the analog data curve C of FIG. 9, is fed to the shift register 60 and is there converted first to squared data D and then used as bits of either ones or zeros in the binary system. So far as the shift register 60 is concerned in a two-transmissivity level system such as being described here, everything with more transmissivity than a certain predetermined value is a one and everything with less transmissivity than that is a zero. At the same time, the signal from the information amplifier 61 passes by leads 62 and 64 to a signal amplitude limit detector 65, used as a transmissivity limit detector, which through logic circuitry yet to be described produces an error signal if the transmissivity is either above a certain high limit or below a certain other low limit. Thus, if the light transmissivity does not lie within the prescribed range between these limits, something is wrong, and a signal is produced which eventually indicates an error, as will be explained below.

This means that the shift register 60 need only discriminate in one way—whether the amplitude of the signal in the leads 62 and 63 is above or below a certain level. The signal amplitude limit detector 65 has an output 66 for signals below a predetermined level (and, as applied to transmissivity, treated as too opaque) and another output 67 for signals above a predetermined level (here, treated as too transparent). Thereby, four levels of transmissivity are distinguished, two of them treated as errors.

Preferably, the signal amplitude limit detector 65 is designed to produce a one at outputs 66 and 67 when the input lies within the prescribed transmissivity limits; the detector 65 produces a zero signal at the output 66 when the transmissivity of a card data zone 24 is too opaque, and it produces a zero signal at the output 67 when the transmissivity of a card data zone 24 is too transparent. Any such zero means a bad card reading, either because the card is inacceptable or is dirty or some defect is present. The logic circuitry cannot yet be described completely for now all that can be said is that both outputs 66 and 67 are fed to a NAND gate 68, and that a zero or outside-the-limit signal at either output 66 or 67 results in a one signal from the NAND gate 68, and that a zero or outside-the-limit signal at either output 66 or 67 results in a one signal from the NAND gate 68 at its output 69. The feeding of one signals to the NAND gate 68 means that a zero signal will pass from the output 69 of the NAND gate 68.

The pulses from the pulse generator 57 also go to the counter 45 which counts to see whether there are 16 pulses, i.e., 16 light areas 26 on the card 15. If there are fewer than 16 pulses or more than 16 pulses, there are consequences.

The counter 45 is shown with two AND gates 70 and 71. The AND gate 70 indicates when a full count—16 pulses in this instance—has been made and so signals its output lead 72. The AND gate 71 signals a zero count, both at the beginning of operations (before a card 15 is inserted into the reader 30) and at the completion of each count of sixteen and accordingly places a signal in its output lead 73. Thus the meaning of the signal in the output 72 is the counter 45 has counted 15 clock pulses, and the meaning of the signal to the output 73 is the counter 45 is now at a zero stage, no pulses have been counted on a new cycle.

The output from the AND gate 70 of the counter 45 goes via leads 72 and 74 to a J-K flip-flop 75. The clock input of this flip-flop 75 comes from the clock pulse generator 57 via a lead 76, the same input that drives the counter 45, and the third input is grounded. Thus, when the input 74 to the flip-flop 75 is energized, indicating that 15 previous pulses have been applied to the lead 76, and then a subsequent pulse—the sixteenth—is applied to the lead 76, the flip-flop 75 is turned on. Only one output from the flip-flop 75 is employed, and it feeds leads 77 and 78.

Output from the AND gate 70 also goes via leads 72 and 79 to an AND gate 80, which receives the output of the flip-flop 75 as its other input. The output from the AND gate 80 goes via a lead 81 to a second J-K flip-flop 82. The clock input of the flip-flop 82 is also from the lead 76, and its third input is also grounded. Again, only one output is used, going to leads 83, 84 and 85. The second flip-flop 82 will be explained further after more foundation.

The second output lead 78 of the first flip-flop 75—which indicates, it will be remembered, that all 16 clock pulses of the data-acquisition row 22 have been counted—is used for several things: (1) a signal is sent by the lead 78 to the shift register 60 indicating completion of its first stage and readying it to receive information from the keyboard 35; (2) a signal is sent by the lead 78 and a lead 86 to the clock pulse generator 57 changing its mode, so that instead of generating only one pulse per signal (as it does when counting the pulses in the row 22) it generates four pulses per signal, for use in coordinating the reader 30 with the keyboard 35, as will be explained in a moment; (3) a signal is sent via leads 78 and 87 to an AND gate 88 used to indicate full completion of card insertion, as will be explained below; and (4) a signal is fed to an inverter 89.

The inverter 89 sends a 16 pulse counted signal to a NAND gate 90 via leads 91 and 92, this signal coming as a zero, and a one signal in the lead 92 means that the count is not yet complete. The other input for the NAND gate is the output lead 69 from the NAND gate 68. If both outputs 69 and 92 to the NAND gate 90 are zero, then this means that 16 clock pulses have been counted and that all the corresponding data pulses have been checked and found to be within the desired transmissivity limits, and the NAND gate 90 then signals a one to its output 93. An error in any of the data zones 24 would produce a zero in the output 93, and this would be an error signal, not waiting for completion of the pulse count to be made manifest.

The output lead 93 from the NAND gate 90 and the output from the inverter 89, fed by leads 91 and 94, become the outputs to another NAND gate 95, and if there are no errors, it will give its output lead 96 a zero signal; if there has been an error at any data zone, the output lead 96 receives a one signal, which it transmits to an error J-K flip-flop 97. The clocking pulse for the error flip-flop 97 comes from the clock pulse line via a route not described heretofore. Output from the Schmitt trigger 56 goes via a line 98 to another pulse generator 99 whose output is connected to the error flip-flop 97 via a lead 100. The other input to the flip-flop 97 is grounded. Once again, only one output from the flip-flop 97 is used, the normally energized output preferably being connected to a lead 101. When there is a zero output (de-energized) signal, this means either a zero state or an error. The lead 101 goes via an inverter 101a to a NAND gate 102; when the inverted error signal is received at the input to the NAND gate 102, its output 103 causes a red light 104 to light, and, if desired an alarm may be sounded or other action taken.

The lead 101 also supplies one output of an AND gate 105, the other input to which is the lead 73 from the zero state and gate 71 of the counter 45. The AND gate 105 is thus enabled only when the counter 45 is in the zero state (or completed state) and the error flip-flop 97 is in the one or energized state —in other words, when the card 15 has been inserted in the machine, its 16 clock pulses are all counted and no error found in the data input. The output 106 of the AND gate 105 is utilized in three different ways as will shortly be seen, each controlling a different indicator light or other signal.

It is important to determine not only that 16 pulses have been counted but also that only sixteen pulses are there to be counted. For example, if the cardholder inserts the card 15 partway, backs up a little, and then inserts it the rest of the way, these will be more than 16 clock pulses, and the data will be erroneous. That is why the line 100 is used to clock the error flip-flop, for if a clocking pulse from the pulse generator 99 is received by the error flip-flop 97 after 16 pulses have been counted by the counter 45, there is an error, and the output lead 101 will be so actuated. The error may be remedied by withdrawing the card 15 and putting it in again—if it is a valid card.

Further, it is important to assure that the card 15 be fully inserted in the reader 30. Mechanically, this can be done by the microswitch 44, which sends its full insertion signal via a lead 107 to a switch 108 and thence (if the switch is closed to the lead 107) to a lead 109 and to the input of the AND gate 88.

However, mechanical microswitches are sometimes less reliable than electronic devices. Therefore, if the dark spot 28 is present in the data information row 23 of the card 15 past all the data acquisition zones 22, it will be detected by the signal amplitude limit detector as too opaque. Since this particularly too opaque signal comes after all of the clock pulses, it will not actuate the error flip-flop as an error; instead, it is sent by a lead 110 to the switch 108, and if the switch 108 is closed to the lead 110, the signal goes via the lead 109 to the AND gate 88. It will be recalled that the other input to the AND gate 88 is the lead 87 which comes from the lead 78 and is the output from the first flip-flop 75, indicating that the 16 pulses have been counted. Hence (however the switch 108 is thrown), an output signal to a lead 111 from the AND gate 88 means that the card 15 has been fully inserted and all 16 clock pulses have been counted.

The lead 111 sends this output signal to two leads 112 and 113. The lead 112 goes to an AND gate 115, whose output 116 lights a green light 117. The AND gate 115 has two other inputs, one being the lead 106 (no error and counter 45 at zero state; i.e., no count begun or count finished). The other input is a lead 118 from an inverter 119 connected to the lead 85 from the output of the second flip-flop 82, thereby indicating that the second flip-flop 82 has not yet been actuated. This means that the keyboard data has either not been supplied yet or has not yet been read; since it is read very quickly it usually means that the keyboard data has not yet been supplied.

Thus, the green light 117 is lighted when the card 15 has been fully inserted into the reader 30, 16 clock pulses on the row 22 have been counted and no more, and no errors have been found on the card 15. It may therefore be used to signal the cardholder that now he should supply the keyboard data from his memory.

The keyboard 35 has ten digits on it and has a decimal-to-binary converter. Supposing, by way of example only, that a four-digit numeral is to be used, the user touches four keys, one for each digit and in proper order. This action sends a signal E (see FIG. 9) via a lead 120 to a four-digit comparator 121 which is supplied with the card's concealed number by the shift register 60. A comparison test signal also flows by a lead 122 from the keyboard's circuit to a first delay circuit 123, then to a Schmitt trigger 124, and then to a second delay circuit 125. One output from the second delay circuit 125 sends a signal F (FIG. 9) via a lead 126 to the clock pulse generator 57. It will be recalled that insertion of the card 15 in the reader 30 and the reading of all 16 of the clock pulses causes a signal from the output of the first flip-flop 75 to go via leads 78 and 86 to the clock pulse generator and to change it to operate four pulses at a time. Thus, the keyboard's four pulses are counted as four pulses per key by the counter 45, which then counts again up to 16.

When the fourth key on the keyboard 35 is pressed, the counter 45 (after a slight delay to prevent signal interference) counts to 16,and then there is a new output from the AND gate 70. Thus, the input to the AND gate 80 is fed by the output 77 from the first flip-flop 75 (meaning the 16 clock pulses on the card) and the output 72,79 from the AND gate 70 (meaning the four pulses for the keyboard 35). There is then output from the AND gate 80 via the lead 81, and the second flip-flop 82 is actuated.

In other words, the actuation of the second flip-flop 82 means that the card's pulses have been completely counted, and so have the pulses from the keyboard 35. Hence, the activation of the lead 85 indicates these phenomena, and the signal to the inverter 119 acts in the AND gate 115 to turn off the green light 117.

In the meantime, the output for the second flip-flop 82 goes via lead 83 to a time-delay circuit 127 and from there to an AND gate 128, the other output to which is the lead 84 from the same flip-flop 82; output from the AND gate 128 goes via a lead 129 to a final enabling AND gate 130.

Meanwhile, the comparator 121 compares the card's number from the shift register 60 with the keyboard input. If each of the four digits is the same in both numbers, the number is the same and a no error signal goes to an output lead 131. If at least one digit is wrong, the signal is an error signal.

The lead 131 goes to a NAND gate 132, the other input to which is the lead 113 from the AND gate 88. If both input signals to the NAND gate 132 are one, then the card 15 has been fully inserted, all its clock pulses have been counted, and its data signals correspond to the keyboard input, and the result is sent via an output 133 to a second error flip-flop 134.

The second error flip-flop 134 is clocked via an AND gate 135, whose input is from the Schmitt trigger 124 by lead 136 and from the delay circuit 135 by lead 137. The output 138 from the AND gate 135 goes directly to the second error flip-flop 134, whose third input terminal is grounded.

Both outputs of the second error flip-flop 134 are used. If there is no error, a zero signal goes to an AND gate 140 via a lead 141, and a lead 142 goes to the final AND gate 130, thereby causing output 143 from the AND gate 130 to go to light a green light 144 and actuate a gate-opening solenoid 145 or other such device, if desired. (Both green lights 117 and 144 may be the same bulb if desired, but the activating circuits 116 and 143 are quite distinct.)

If there has been an error in the keyboard input— if the number put in there differs from the number coded on the card 15, then a zero signal goes to the AND gate 130, and the green light 144 and solenoid 145 are not operated. Also, an error signal goes to the AND gate 140, whose other input is from the lead 85. The purpose of the AND gate 140 is to delay the lighting of the red light 104 until after all four digits have been entered on the keyboard; otherwise it would be too easy for someone to work on each digit until he got the right one.

One further light is provided: a yellow light 150, lit by a signal in the lead 151 from an AND gate 152. The yellow light 150 is a ready signal to indicate that no card is in the reader and that it is all right to insert one. Hence, one input to the AND gate 152 is the lead 106 from the AND gate 105, indicating that the counter is in the zero state (no counting done at all) and no error signal. The other lead 153 comes from the lead 92 and indicates that the flip-flop 75 is in the zero or cleared state, ready for the next card to be inserted.

The keyboard 35 is provided with a clear key 155 which can be used to clear the device, by moving all the flip-flops into their correct starting position. Also, the clearing system provides for automatic clearing when a card 15 has been properly installed, read, and withdrawn.

The clear kay 155 is connected by a lead 156 to an OR gate 157. The output from the gate 157 goes through a line 158, from which a lead 159 goes to the second error flip-flop 134, and a lead 160 goes to reset the first error flip-flop 97. Then leads 161, 162, and 163 go to reset the counter 45, the first flip-flop 75 and the second flip-flop 82.

Automatic clearance is provided by the output signal from the final activating AND gate 130, via a lead 165, a pulse generator 166, and a lead line 167 going from the pulse generator 166 to the OR gate 157.

Thus the reader 30 has four lights: a yellow light 150 to indicate that the reader 30 is ready to receive a card 15, a first green light 117 meaning that the card 15 has been read and is satisfactory; a second green light 144 indicating that the memory of the cardholder checks with the code on the card 15 and that the solenoid 145 is being energized; and a red light 104 indicating that something is wrong either with the card 15 or with the cardholder's memory, or both.

Figures 10, 11:
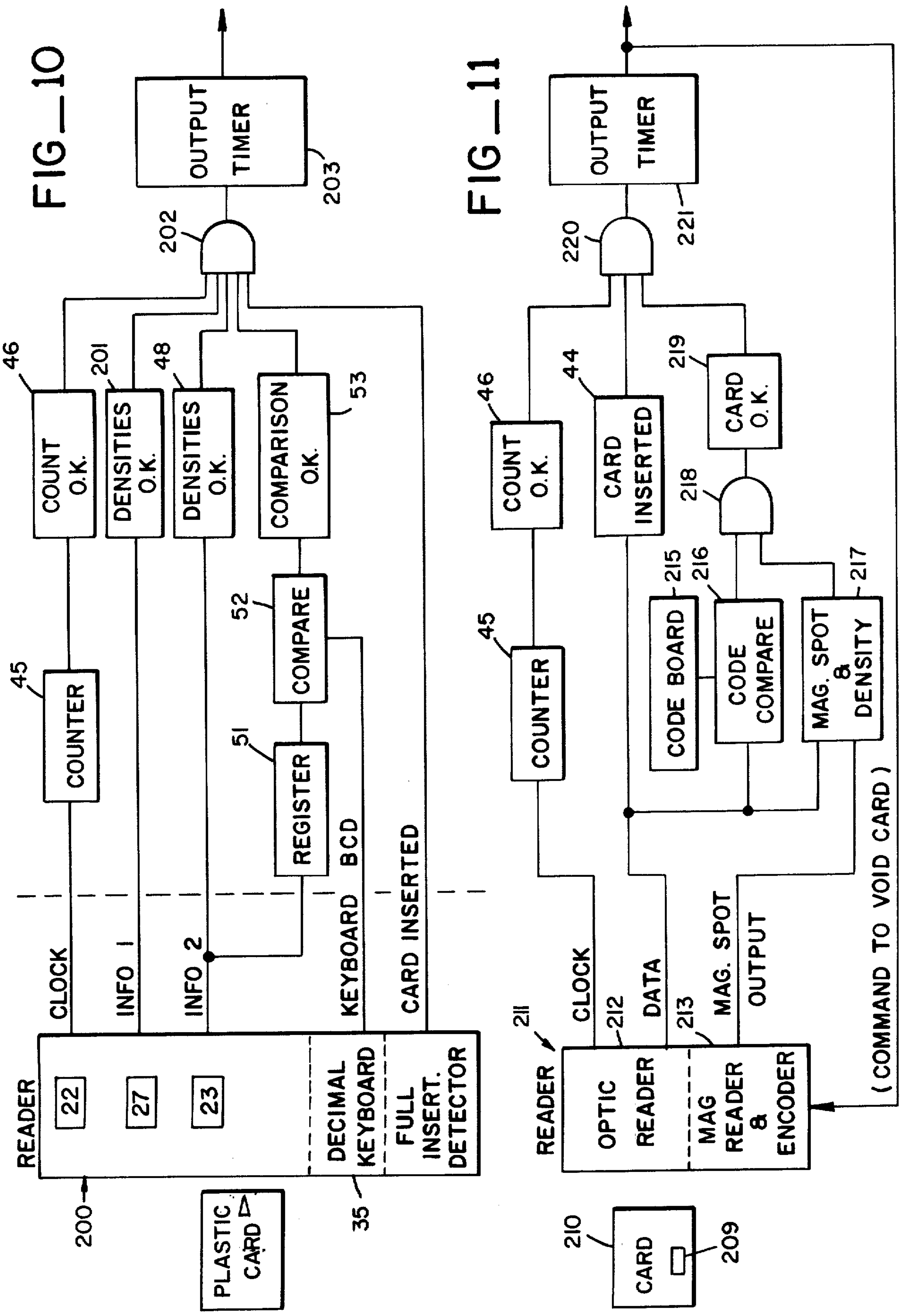
FIG. 10 is a simple block diagram of a modified form of reader, also embodying the principles of this invention.
FIG. 11 is a simple block diagram of another modified form of reader portion of a device employing a computer memory unit system.

A Reader for the Card of FIG. 4 (FIG. 10)

FIG. 10 shows a function-type block diagram like that of FIG. 7 for a reader 200 which is very similar to the reader 30 except that it is equipped to take a card like that shown in FIG. 4. Here there is still one pulse acquisition row 22, but there are two information rows 23 and 27. Operation is very similar to what has already been described. There is, of course, a difference in the circuit to take care of the use of both rows and the additive function is therefore increased to read more numbers. So far as the information row 2 is concerned, it corresponds exactly with the row 23, and the row shown here as information row 1 is the row 27. This row has a density checking function 201; usually the row 27 has different data for the row 23 and has its own comparators. The outputs of all the liness go to an additive function 202 and from there to an output timer 203. Again, the reader 200 checks the densities at 48 and 201 and sends them to the AND function 202 which goes to the output device 203.

The circuitry for both lines of information are substantially that already disclosed except that, only one set is used for the comparison with the keyboard 35.

A device with a magnetic non-reentry addition

Some cards are presently made which have a magnetic spot on them which is magnetized alternately N and S by the reading machines to prevent a certain type of reentry. For example, a certain card may admit one to a parking lot, but the card may not be used again for admission until it shows that the user left the parking lot. This is to prevent one person from handing his card out to others and have them enter the parking lot and to have a number of users enter and then all of them leave later on.

The transmissivity reader of the present invention can be combined with this magnetic system, as FIG. 11 shows. A magnetic spot 209 on a card 210 may be used to prevent reentry without first having the magnetism reversed.

A reader 211 may then be a composite reader having an optical reader section 212 such as that already described, and a magnetic reader and encoder 213. The optical reading is done, as already described, with a circuit already given. In addition, the data row here is shown sending a signal for a comparison with a code board 215 at a code compare station 216, where the transmissivity is checked.

The magnetic reading is done by one of the known type of magnetic reading devices 213 which both reads the magnetizable spot and reverses the polarity of magnetization, so that it may be N when presented and S from the encoder 213. The magnetic spot is compared and the transmissivity of the data code is read at a station 217 and is sent to an addition function device 218, as is the output of the station 216. Thereby, the reader 211 is satisfied that the card 210 is proper both optically and magnetically at a station 219, and then that the outputs from stations 44 and 46 go to another addition function 220, which goes to an output 211. The output, in this instance, is also equipped to void a card which goes through it, that is, to reverse the polarity of the magnetic spot.

Conclusion

It will be apparent that the invention is versatile. The keyboard 35 need not be on all readers, but when present adds to the security. Cards can be voided periodically, and replaced by new cards, and the setting of the reader for this can be done quickly and easily, as by a printed circuit card. Lights, audible alarms or signals, and actual operation of doors, gates, or other machinery can be actuated.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A reader for identification cards and the like of the type having a series of translucent data zones, each of which is neither opaque nor transparent, and a related series of data acquisition zones for serially clocking said data zones during decoding, including in combination:

first sensing means for reading said data acquisition row and producing therefrom an electrical signal varying in amplitude, clocking means actuated by said first sensing means, for converting said signal to a series of clocking pulses, one for each data acquisition zone, counting means for counting the number of clocking pulses set up by said clocking means and indicating when a predetermined number of them has been read, corresponding to the number of data acquisition zones found on a normal, authentic said card, second sensing means for reading the light transmissivity of each data zone in said row of data zones and producing therefore an electrical signal, error-determining means connected electrically to said second sensing means for determining, in synchronization with a corresponding said clock pulse, whether each and every data zone lies within a predetermined range of transmissivity, being neither too opaque or too transparent, differentiation means connected electrically to said second sensing means for differentiating between a plurality of transmissivities within said predetermined range and thereby providing a value for each said data zone, according to its transmissivity, comparison means for electrically comparing each said value with a predetermined authentication code and thereby determining whether said data zone series corresponds to said authentication code, and authentication means connected to each of said counting means, said error determining means, and said comparison means for indicating authenticity when the predetermined number of pulses has been counted without any errors having been found in any said data zone and when said comparison means indicates full correspondence of said data zone series with the predetermined authentic code.

2. The reader of claim 1 having full-insertion means for determining when a card has been fully inserted into said reader, said full insertion means being connected electrically to said authentication means, a full insertion signal being required for actuation of said authentication means.

3. The reader of claim 2 having excess pulse determining means for discovering whether, by the time of full insertion, any pulses in excess of said predetermined number are obtained from said data-acquisition series, said excess pulse determining means being connected to said error determining means for producing an error signal preventing authentication if there is any excess pulse.

4. The reader of claim 1 having error-indicating means connected to said error-determining means for indicating a determined error.

5. The reader of claim 1 having an addition:

a keyboard having a plurality of keys for manual input of a series of digits, pulse generation means for creating electrical pulses from said input of digits, comparison means connected electrically to said pulse generation means for comparing each said digit with said data-zone values to determine whether they represent the same code, second error-determining means for indicating failure of the keyboard-emplaced digits to correspond to the data-zone values, said second error-determining means being connected to said authentication means and required thereby for authentication.

6. The reader of claim 5 having:

means for counting the keyboard-induced pulses, means for indicating whether any error has been found by said second error-determining means only after the pulses have been counted up to at least the prescribed number.

7. A reader for identification cards and the like having a data-acquisition row of alternating dark and light zones, and at least one data information row each having a corresponding series of data zones having light transmissivities that lie within a predetermined range of transmissivities and within that range are differentiated into a plurality of different transmissivities, said reader comprising:

a card-receiving housing for receiving cards of a predetermined size and having an insertion slot with a pair of facing plates between which the card is to go and a pair of edge-defining means for aligning each said card, one said plate having a plurality of light sources, one for each said row, located side by side and so as to correspond to the location of said rows in an authentic said card, and the opposite said plate having a corresponding plurality of reading means each opposite to and facing one said light source for reading the light transmissivity of material lying in the row intervening between it and its light source and for generating an electrical signal corresponding in amplitude to said light transmissivity, said reading means for said data information row including means for distinguishing among a plurality of light transmissivities and for distinguishing each such transmissivity from complete transparency and from complete opacity.

8. The reader of claim 7 having microswitch means on one said plate set for actuation by an inserted said card only when said card is fully inserted in said slot.

9. The reader of claim 7 wherein each said reading means for reading the light transmissivity comprises a phototransistor.

10. The reader of claim 7 having:

pulse-generating means connected electrically to the reading means for said data-acquisition row, for generating a pulse each light-dark alternation, differentiation means connected electrically to each said reading means for a said data-information row and to said pulse-generating means for acting at each said pulse to differentiate between a plurality of transmissivities within said predetermined range, said range excluding complete transparency and complete opacity, and thereby providing a value for each said data zone that depends on its transmissivity, and error determination means for determining serially whether each and every data zone lies within the predetermined range of transmissivities.

11. The reader of claim 10 having:

counting means for counting the said pulses and indicating when a predetermined number of said pulses has been counted, the number being the number of pulses that should be present on an authentic card.

12. The reader of claim 11 having:

comparison means for comparing each said data-zone value with a predetermined authentication code and for indicating whether said data-zone row contains an authentic code, and authentication means connected to each of said counting means, said error-determining means, and said comparison means for indicating authenticity when the predetermined number of pulses has been counted without any errors having been found on said data zone row and when said comparison means indicates that said data zone row contains an authentic code.

13. The reader of claim 10 for use with a card whose last data zone of one row is followed by a zone lying outside the predetermined transmissivity range and having no corresponding data-acquisition light-dark zone, so that no corresponding pulse is generated, said error-determining means then sending a signal indicating full insertion of said card.

14. A reader for identification cards and the like having a data-acquisition row provided with a predetermined number of zones, each serving when read in said reader for generating a clock pulse, and at least one data-information row, each having the same number of data zones, all of which lie within a predetermined range of light transmissivity and which are differentiated into a plurality of different transmissivities within that range, including in combination:

card-receiving means having a card-insertion slot, a specifically located light source for each said data-information row of an authentic card, and transmissivity-reading means opposite each said light source for generating an electrical signal whose amplitude corresponds to the light transmissivity of the zone of said card then interposed between it and said light source, and means for generating a signal for each zone in said data-acquisition row, amplifier means for each said signal, a clock pulse generator for generating from the amplified signals from said data-acquisition row a pulse for each zone thereof, to serve as clocking pulses, counting means connected to said generator for counting said clocking pulses and for generating a signal indicating that said predetermined number of pulses has been counted, a shift register and comparator means connected to said generator and to said amplifier for each said data-zone row, reading the transmissivity signal for each data zone upon receiving the corresponding clock pulse, classifying this transmissivity signal into one of the predetermined transmissivities within the predetermined range, and thereby decoding the data from that data zone and comparing it with an encoded bank of data to determine card authenticity or identity, signal amplitude limit detector means receiving the amplified signals from the amplifier means for said data zones and actuated to produce an error signal if any data zone lies outside the prescribed range of transmissivities, an error-determining means connected to said signal amplitude limit detector means through logic circuitry and actuated to an error position when an error signal is given along with a clocked pulse, an error indicator actuated by actuation of said error flip-flop means, means for indicating full insertion of a said card, and authentication means for indicating card authenticity in the absence of an error indication and connected to said error-determining means so that the authentication means cannot be actuated when said error-determining means has been actuated, said authentication means being connected to said counting means for actuation only upon completion of a said pulse count and to said means for indicating full insertion for actuation only if said card has been fully inserted.

15. The reader of claim 14 having means connected to said error-determining means for actuating it if any pulses are generated after completion of the prescribed count.

16. The reader of claim 15 wherein said means for indicating full insertion comprises a microswitch at the card insertion slot actuated by a card only after full insertion thereof.

17. The reader of claim 14 wherein said means for indicating full insertion is used with a card whose last data zone is followed by a zone lying outside the predetermined transmissivity range and having no corresponding data-acquisition zone and hence no corresponding pulse generated, said signal amplitude limit detector means then sending a signal which does not actuate said error-determining means since it has no corresponding clock pulse, said reader having an AND gate with two inputs, one connected to the said output signal from said signal amplitude limit detector means, the other connected to the output from said counting means indication completion of the count of the predetermined number of pulses, the output from said AND gate being connected to said authentication means.

18. The reader of claim 14 having a keyboard for manual input of digits, means for generating an electrical signal from each digit input in via said keyboard, a comparator connected to said shift register means and receiving the signals from said keyboard, for comparing these signals with the information from a said data-information row and for producing an error signal if any lack of correspondence is found.

means for counting the keyboard input signals and for determining completion of the correct number of digit inputs, and means for sending the error signal from said comparator to prevent actuation of said authentication means only after the conclusion of said completion of counting of said keyboard input signals, said authentication means being rendered unactuable by an error signal from said comparator.

19. In a reader for identification cards and the like of the type having translucent data zones, each of which is neither opaque nor transparent having the combination of:

sensing means for reading the light transmissivity of each data zone;

error-determining means for determining whether each and every data zone lies within a predetermined range of transmissivity, being neither too opaque or too transparent, and differentiation means for differentiating between a plurality of transmissivities within said predetermined range and thereby providing a decode signal for each said data zone according to its transmissivity.

20. The combination of claim 19 having:

comparison means for comparing each said decode signal with a predetermined authentication code and thereby determining whether said data-zone row contains an authentic code, and authentication means connected to each of said error-determining means and said comparison means for indicating authenticity when the data zones have been processed without any errors having been found and when said comparison means indicates full correspondence of said data-zone with the predetermined authentic code.

21. The combination of claim 20 having means for so altering the card during reading that reentry without a realteration of the card will not produce authentication again.

22. A reader for identification cards and the like having at least one data-information row each having a series of data zones having light transmissivities that lie within a predetermined range of transmissivities and within that range are differentiated into a plurality of different transmissivities, said reader comprising:

a card-receiving housing for receiving cards of a predetermined size and having an insertion slot with a pair of facing plates between which the card is to go and a pair of edge-defining means for aligning said cards, one said plate having a light source for each said row in a position corresponding to the location of that said row in an authentic said card, and the opposite said plate having a light-sensitive means opposite to and facing each said light source for reading the light transmissivity of material lying between it and its light source and for generating an electrical signal corresponding to said light transmissivity, said reading means for said data information row including means for distinguishing among a plurality of light transmissivities and for distinguishing each such transmissivity from complete transparency and from complete opacity.

* * * * *